United States Patent [19]

Rajagopalan et al.

[11] Patent Number: 5,631,324
[45] Date of Patent: May 20, 1997

[54] GOLF BALL COVERS

[75] Inventors: Murali Rajagopalan, South Dartmouth, Mass.; Robert J. Statz, Kennett Square, Pa.

[73] Assignees: Acushnet Company, Fairhaven, Mass.; E. I. Du Pont de Nemours & Co., Wilmington, Del.

[21] Appl. No.: 488,162

[22] Filed: Jun. 7, 1995

[51] Int. Cl.$^6$ .......................... C08L 23/08; A63B 37/00
[52] U.S. Cl. .......................... 473/385; 525/221; 525/228; 525/201
[58] Field of Search .................. 525/201, 228, 525/221; 273/235 R

[56] References Cited

U.S. PATENT DOCUMENTS

| | | | |
|---|---|---|---|
| 3,264,272 | 8/1966 | Rees | 260/78.5 |
| 3,454,280 | 7/1969 | Harrison et al. | 273/235 |
| 3,819,768 | 6/1974 | Molitor | 260/897 B |
| 4,070,532 | 1/1978 | Hammer | 526/11.2 |
| 4,167,428 | 9/1979 | Sayles | 149/109.6 |
| 4,323,247 | 4/1982 | Keches et al. | 273/235 R |
| 4,393,099 | 7/1983 | Deregibus | 427/177 |
| 4,508,309 | 4/1985 | Brown | 249/81 |
| 4,526,375 | 7/1985 | Nakade | 273/235 R |
| 4,801,649 | 1/1989 | Statz | 525/183 |
| 4,884,814 | 12/1989 | Sullivan | 273/235 R |
| 4,911,451 | 3/1990 | Sullivan et al. | 273/235 R |
| 5,000,459 | 3/1991 | Isaac | 273/235 R |
| 5,098,105 | 3/1992 | Sullivan | 273/235 R |
| 5,155,157 | 10/1992 | Statz | 524/423 |
| 5,359,000 | 10/1994 | Hamada et al. | 525/74 |
| 5,498,482 | 3/1996 | Buchner | 525/63 |
| 5,543,467 | 8/1996 | Hamada et al. | 525/207 |
| 5,565,524 | 10/1996 | Hamada et al. | 525/208 |

FOREIGN PATENT DOCUMENTS

| | | |
|---|---|---|
| 0534779B1 | 3/1993 | European Pat. Off. . |
| 0557069A1 | 8/1993 | European Pat. Off. . |
| 0652254B1 | 5/1995 | European Pat. Off. . |

*Primary Examiner*—Irina S. Zemel
*Attorney, Agent, or Firm*—Pennie & Edmonds

[57] ABSTRACT

The invention is directed to a golf ball comprising a core and a cover, wherein the cover comprises a blend of at least one olefinic ionomer and a terpolymer, said terpolymer comprising a first monomeric component comprising an olefinic monomer having from about 2 to about 8 carbon atoms, a second monomeric component selected from unsaturated acrylate class ester having from about 2 to about 18 carbon atoms; and, a third monomeric component comprising at least one monomer selected from the group consisting of carbon monoxide, anhydride monomers and monomers having a structure according to the following formula

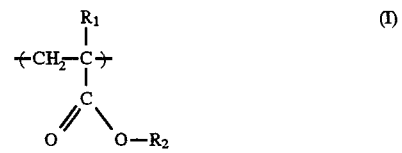

wherein $R_1$ is hydrogen or a linear chain or branched chain alkyl group of from about 1 to about 18 carbon atoms and $R_2$ is selected from the group consisting of linear chain or branched chain alkyl, substituted or unsubstituted carbocyclic and substituted aryl groups containing an epoxy, i.e., glycidyl moiety.

31 Claims, No Drawings

GOLF BALL COVERS

BACKGROUND OF THE INVENTION

1. Field of the Invention

The present invention relates to golf ball covers comprising terpolymers consisting of at least three different monomeric units, one of which is olefinic, one of which is an ester and one of which is carbon monoxide, an anhydride monomer or a monomer containing an epoxy, i.e., glycidyl group.

2. Description of the Prior Art

Throughout its history, the golf ball has undergone an extensive evolution in an effort to improve its play-related characteristics, e.g., durability, distance, and control. The first golf balls appeared around the 14th century and consisted of a leather sack which had been soaked in water and subsequently filled with wet feathers. As the sack dried, the leather would contract and the feathers would expand, resulting in a very hard mass which was then hammered into a round ball. These "feathery" golf balls were in use until about the mid-19th century, when a single piece golf ball made from "gutta percha" was introduced. Gutta percha is a rubber-like material which is made from tree sap. Gutta percha balls were found to be more durable than the feathery balls, but did not offer the same distance as these older balls.

Following the introduction of gutta percha balls, it was discovered that a ball's flight was notably longer and more accurate when its surface had been nicked and/or scratched during use. Accordingly, golf ball manufacturers thereafter developed various methods for providing balls with a gutta percha cover that had a variety of patterns of nicks or markings on the surface. This eventually lead to the complex dimple patterns which are in use on golf balls today.

In the early 1900's, the wound rubber ball, which was considered a major breakthrough in the design of golf balls, was introduced. It consisted of a ball in which a rubber thread was tightly wound around a solid rubber core, which was then encased in a gutta percha cover. The early wound rubber balls lacked uniformity in size and weight, but the ball had a livelier core and the golfer was better able to control the spin of the ball.

Modern day golf balls can be classified as one-piece, two-piece, and three-piece (also known as "wound"). One-piece balls are molded from a homogeneous mass of material with a dimple pattern molded therein. One-piece balls are inexpensive and very durable, but do not provide great distance because of relatively high spin and low velocity. Two-piece balls are made by molding a cover around a solid core. These are the most popular types of balls in use today. Two-piece balls typically have a hard "cutproof" cover which gives a longer distance ball, but which has lower spin rates, resulting in a decreased ability to control the ball.

Three-piece or wound balls are made by molding a cover about a wound core. The core is typically made of rubber and can be solid, semi-solid or have a liquid center. A wound core is prepared by winding a thin thread of elastic material about the center core. The wound core is then covered with a durable cover material. Wound balls are generally softer and provide more spin, resulting in increased control over the ball, but such balls typically travel shorter distances than a two piece ball. As a result of their more complex construction, wound balls generally require a longer time to manufacture and are more expensive to produce than two-piece balls.

The covers of today's golf balls are made from a variety of materials, such as balata, Surlyn™ and Iotek™. Balata is a type of rubber and is the softest of all other cover materials. For many years, balata was the standard cover stock material for most golf balls. Balata covered balls are favored among professionals and more advanced amateur players because the softness of the cover allows the player to achieve spin rates sufficient to more precisely control ball direction and distance, particularly on shorter approach shots.

However, balata covered balls are expensive and less durable as compared to the other covering materials. In particular, balata covered balls are subject to nicks or cuts as a result of a mis-swung golf club, which is not uncommon with the average recreational golfer. Such nicks or cuts detract from the flight characteristics of such balls, rendering them of little use. Accordingly, cover compositions have been developed in an attempt to provide spin rates and a feel approaching those of balata covered balls, while also providing a golf ball with a higher durability and overall distance.

In the mid-1960's, E.I. DuPont de Nemours and Co. discovered a new species of resins known as ionomer resins. These resins are sold under the trademark SURLYN™ and, to a large extent, have replaced balata as a cover stock material. Chemically, these ionomer resins are a copolymer of an olefin and an alpha, beta ethylenically unsaturated carboxylic acid with 10–90% of the carboxylic acid groups neutralized by a metal ion. See U.S. Pat. No. 3,264,272. Today, the only commercially available ionomer resins are copolymers of ethylene and methacrylic or acrylic acid. These ionomer resins are distinguished by the type of metal ion, the amount of acid, and the degree of neutralization.

Dunlop Rubber Company obtained the first patent on the use of SURLYN™ for the cover of a golf ball, i.e., U.S. Pat. No. 3,454,280 issued Jul. 8, 1969. Since then, there have been a number of disclosures on the use of these ionomer resins in the cover composition of a golf ball. See, for example, U.S. Pat. Nos. 3,819,768 issued Jun. 25, 1974; 4,323,247 issued Apr. 6, 1982; 4,526,375 issued Jul 2, 1985; 4,884,814 issued Dec. 3, 1989; and 4,911,451 issued Mar. 27, 1990. However, while Surlyn™ covered golf balls as described in the preceding patents possess virtually cutproof covers, they have inferior spin and feel properties as compared to balata covered balls.

In November, 1986, DuPont introduced a sodium and zinc ionomer resin having a low flexural modulus and suggested using and blending the same with other ionomer resins for making a golf ball cover. Golf ball covers made from these low flexural modulus ionomer resins have improved spin and feel characteristics but relatively low velocity.

In December, 1986, DuPont introduced a lithium ionomer resin which was a copolymer of ethylene and methacrylic acid. These lithium ionomer resins have a very high flexural modulus, typically about 60,000 psi (415 MPa). DuPont suggested that lithium ionomer resins could be used to produce a golf ball cover which would be more cut resistant and harder than a cover made with either sodium or zinc ionomer resins. DuPont also suggested that a golf ball having a cover made from a lithium ionomer resin would go farther, have a higher coefficient of restitution and be less prone to cutting (i.e., more durable) than a golf ball made from other known ionomer resins such as sodium and zinc ionomer resins and blends thereof. DuPont further suggested that lithium ionomer resins could be used in blends with other ionomer resins where they can impart better cut resistance to those other resins.

The United States Golf Association (USGA) has promulgated a rule that no golf ball shall have an initial velocity that exceeds 255 feet (78 m) per second, i.e., 250 feet (76 m) per second with a 2% tolerance. Golf balls with covers made from ionomer resins with a low flexural modulus are woefully below this maximum and, as should be appreciated, all golf ball manufacturers strive to come as close as possible to this limit.

In order to approximate the characteristics of balata covered balls at lower cost, the art has developed balls having a variety of cover compositions. As noted above, these prior art compositions have a considerably higher cut resistance and durability as compared to balata covered balls. However, despite numerous attempts to replicate the performance of balata covered balls, the golf ball cover compositions of the prior art generally suffer from low spin rates which makes them difficult to control near the greens. Further, such balls tend to have relatively poor "click" and feel as compared to the balata covered balls. Additionally, many of the prior art golf ball cover compositions are made with low flexural modulus ionomer resins which have improved spin and feel characteristics, but relatively low velocity, which results in shorter overall distance.

Consequently, a need exists for a golf ball cover composition which provides spin rates and a feel more closely approximating those of balata covered balls, while also providing as high or a higher degree of durability than that provided by the balls presently available or disclosed in the prior art.

SUMMARY OF THE INVENTION

The present invention is directed to a golf ball comprising a cover and a core, wherein the cover comprises a blend of at least one olefinic ionomer and a terpolymer comprising: (a) a first monomeric component of an olefin having from about 2–8 carbon atoms; (b) a second monomeric component of a monomer selected from unsaturated carboxylic acid-based acrylate esters having from about 2 to about 18 carbon atoms; and, (c) a third monomeric component comprising at least one of carbon monoxide (CO), an anhydride monomer (e.g., maleic anhydride) having the general formula

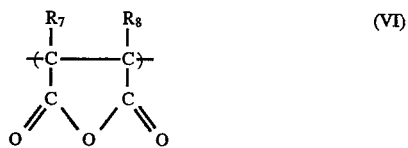

wherein $R_7$ and $R_8$ are the same or different and are chosen from among hydrogen, linear and branched chain alkyl and substituted or unsubstituted carbocyclic groups, or a monomer having a structure according to formula (I) following;

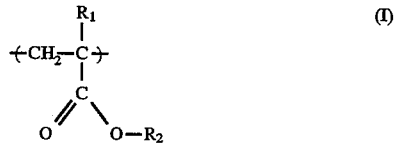

wherein $R_1$ is hydrogen or a linear chain or branched chain alkyl group of from about 1 to about 18 carbon atoms and $R_2$ is selected from linear or branched chain alkyl and substituted or unsubstituted carbocyclic or aryl groups containing an epoxy moiety.

In an alternate embodiment of the present invention, graft copolymers of the terpolymers described herein are used in golf ball covers. In particular, graft polymers can be produced such that the graft segment making up the linkage between polymer chains comprises an anhydride, wherein "anhydride" is taken to mean a compound having the formula:

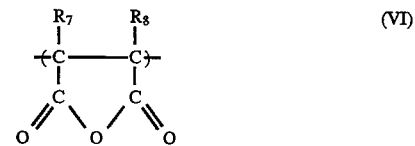

and wherein $R_7$ and $R_8$ are the same or different and are chosen from among hydrogen, linear or branched chain alkyl and substituted or unsubstituted carboxylic groups.

DETAILED DESCRIPTION OF THE INVENTION

The invention is therefore directed to the formation of golf ball covers wherein the cover comprises a blend of at least one olefinic ionomer and a terpolymer comprising: (a) a first monomeric component comprising an olefinic monomer having from about 2 to about 8 carbon atoms; (b) a second monomeric component selected from a first unsaturated acrylate class ester having from about 2 to about 18 carbon atoms; and (c) a third monomeric component which comprises at least one of carbon monoxide, an anhydride monomer and a second acrylate class ester monomer wherein the organic moiety attached at the ester linkage contains an epoxy, i.e., glycidyl, group.

The olefinic ionomer component of the invention with which the subject terpolymer is blended preferably includes E/X/Y copolymers where E is ethylene, X is a softening comonomer such as acrylate or methacrylate present in 0–50 (preferably 0–25, most preferably 0–2) weight percent of the polymer, and Y is acrylic or methacrylic acid present in 5–35 (preferably 10–35, most preferably 15–35) weight percent of the polymer, wherein the acid moiety is neutralized 1–90% (preferably at least 40%, most preferably at least about 60%) to form an ionomer by a cation such as lithium*, sodium*, potassium, magnesium*, calcium, barium, lead, tin, zinc* or aluminum (*=preferred), or a combination of such cations. With regard to the physical properties of these olefinic ionomers, the flex modulus (measured by ASTM D-790) preferably ranges between about 500–150,000 psi. The Shore D hardness (measured by ASTM D-2240) is between about 20 and about 80. Those ionomers may be characterized as having either a "low" melt flow index, i.e., comprising those ionomers having a melt flow index of from about 0.3 to less than two grams per 10 minutes, or as "high" melt flow index ionomers, having a melt flow index of from 2 to about 10 grams per minute. Acid-containing ethylene copolymers, for example, useful with the invention include, but are not limited to ethylene/acrylic acid, ethylene/methacrylic acid, ethylene/acrylic acid/n-butyl acrylate, ethylene/methacrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers. The manner in which the ionomers are made is well known in the art as described in, e.g., U.S. Pat. No. 3,262,272 to Rees.

Turning now to the terpolymer of the invention, the first monomeric component is an olefin, which is an unsaturated hydrocarbon having the general formula $C_nH_{2n}$, characterized by a relatively high level of chemical activity. The preferred class of olefins are those known as vinyl monomers, and in particular those having a terminal point of unsaturation capable of undergoing polymerization reactions. U.S. Pat. No. 4,393,099 provides a representative description of $\alpha$-$\beta$-olefinically unsaturated resins (see in particular column 5 lines 22–70 and column 6 lines 1–70) and thus the disclosure of this patent is expressly incorporated herein by reference. While a variety of olefinic monomers are capable of being used according to the present invention, olefinic monomers found to be most useful in forming the present terpolymer include, but are not specifically limited to, ethylene ($CH_2=CH_2$); propylene ($CH_2=CHCH_3$); butene ($CH_2=CHCH_2CH_3$); pentene ($CH_2=CH(CH_2)_2CH_3$); hexene ($CH_2=CH(CH_2)_3CH_3$); heptene ($CH_2=CH(CH_2)_4CH_3$) and octene ($CH_2=CH(CH_2)_5CH_3$). The most preferred of these materials is ethylene due to its low cost, ready availability and the ease with which it is incorporated into the terpolymer of the invention.

The second monomeric component of the presently claimed terpolymer comprises an unsaturated carboxylic acid based acrylate class ester having from about two to at about 18 carbon atoms. Preferred acrylate class esters for use in the invention include those based upon monomers including acrylic, methacrylic, $\alpha$-chloroacrylic, crotonic, maleic, fumaric, itaconic and cinnamic acids.

The preferred esters are the acrylate class esters having the general formula

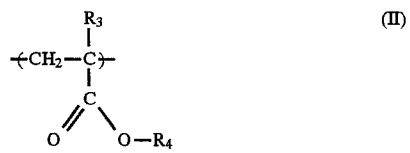
(II)

wherein $R_3$ is hydrogen or a linear or branched chain alkyl group having from about 1 to about 20 carbon atoms and $R_4$ is selected from the same materials as $R_3$, with the proviso that $R_4$ will generally not be hydrogen. For purposes of the present invention the range of linear or branched chain alkyl groups having from 1 to 20 carbon atoms useful in the invention includes each and every such alkyl group having from 1 to 20 carbon atoms, even though such groups are not all specifically identified herein.

The acrylate class esters for use with the terpolymers of the present invention are based upon unsaturated acrylic class acids such as ethyl acrylic acid, methyl acrylic acid and the like. The process for converting these acids to ester components is well known in the art and thus need not be described here. Esters for use in forming the terpolymer of the invention contain, as noted above, from about 2 to about 18 carbon atoms. For purposes of the present invention, the phrase ester having from about 2 to about 18 carbon atoms specifically includes each and every such ester compound, even though they are not all specifically named herein. Preferred acrylate ester compositions include, but are not limited to, pentyl acrylate, pentyl methacrylate, n-butyl acrylate, iso-butyl acrylate, n-butyl methacrylate, propyl acrylate, propyl methacrylate, ethyl acrylate, ethyl methacrylate, methyl methacrylate, methyl acrylate, iso-burnyl acrylate, iso-burnyl methacrylate and tetrahydrofurfuryl acrylate.

The third monomeric component of the terpolymer of the invention comprises at least one of the following monomer "types": (a) carbon monoxide (CO), as taught for example, in U.S. Pat. Nos. 4,070,532 and 4,167,428 to Hammer, the disclosure of which is expressly incorporated herein by reference; (b) an anhydride monomer such as maleic anhydride or any of those anhydrides described below with regard to formula VI; or (c) a monomer having the general formula

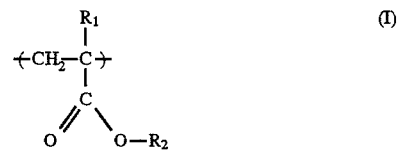
(I)

wherein $R_1$ is hydrogen or a linear or branched chain alkyl group comprising from about 1 to about 18 carbon atoms, e.g., methyl, ethyl, propyl, butyl, etc. and $R_2$ is selected from linear chain or branched chain alkyl, substituted or unsubstituted carbocylic and substituted or unsubstituted aryl groups containing an epoxy, i.e., glycidyl moiety.

As used herein, the phrase linear chain or branched chain alkyl group of from about 1 to about 18 carbon atoms means any substituted or unsubstituted acyclic carbon-containing compounds, including alkanes, alkenes and alkynes. Examples of alkyl groups include lower alkyl, for example, methyl, ethyl, n-propyl, iso-propyl, n-butyl, iso-butyl or tert-butyl; higher alkyl, for example, octyl, nonyl, decyl, and the like; and lower alkylene, for example, ethylene, propylene, propyldiene, butylene, butyldiene, and the like. The ordinary skilled artisan is familiar with numerous linear and branched alkyl groups which are within the scope of the present invention.

In addition, such alkyl groups as described above may additionally contain various substituents in which one or more hydrogen atoms has been replaced by a functional group. Functional groups include but are not limited to hydroxyl, sulfonic, siloxane, amino, carboxyl, amide, esther, ether, and halogen (fluorine, chlorine, bromine and iodine), to mention but a few.

As used herein, substituted and unsubstituted carbocyclic groups means cyclic carbon-containing compounds, including but not limited to cyclopentyl, cyclohexyl, cycloheptyl, admantyl, and the like. Such cyclic groups may also contain various substituents in which one or more hydrogen atoms has been replaced by a functional group. Such functional groups include those described above, as well as the lower alkyl groups described above. The cyclic groups of the invention may further comprise a heteroatom. For example, in a specific embodiment, one of either $R_1$, $R_2$, $R_3$ or $R_4$ is cyclohexanol.

As used herein, substituted and unsubstituted aryl groups means a hydrocarbon ring bearing a system of conjugated double bonds, usually comprising six or more $\pi$ (pi) electrons. Examples of aryl groups include, but are not limited to, phenyl, naphthyl, anisyl, toluyl, xylenyl and the like. According to the present invention, aryl also includes heteroaryl groups, e.g., pyrimidine or thiophene. These aryl groups may also be substituted with any number of a variety of functional groups. In addition to the functional groups described above in connection with substituted alkyl groups and carbocyclic groups, functional groups on the aryl groups can be nitro groups.

As mentioned above, $R_1$–$R_4$ can also represent any combination of alkyl, carbocyclic or aryl groups, for example, 1-cyclohexylpropyl, benzyl cyclohexylmethyl, 2-cyclohexylpropyl, 2,2-methylcyclohexylpropyl, 2,2-methylphenylpropyl, 2,2-methylphyenylbutyl.

The monomeric units described above may be combined according to any of the methods described below to form polymers having a structure according to formula III:

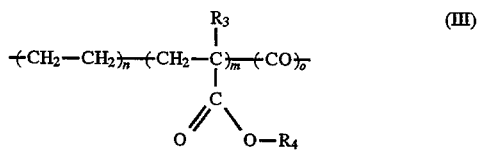

or according to Formula IV below:

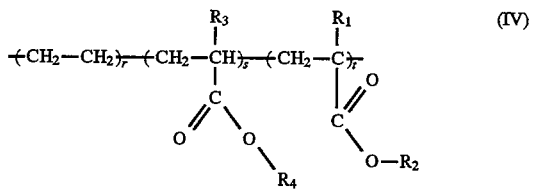

wherein $R_1$, $R_2$, $R_3$, and $R_4$, are as defined above.

The letters r, s, t, n, m and o are each real numbers greater than zero. These numbers represent the relative weight percentages of the seperate monomeric components of the terpolymers of the present invention. The letters r, s, t, n, m, and o represent values that will result in a polymer having properties desirable for use in golf balls. It is preferred that the letters n and r, which represent the relative amounts of olefinic monomer in the subject polymers, are numbers which result in a terpolymer comprising from about about 5 to about 75 wt % olefinic monomer. In a more preferred embodiment of the present invention, n and r represent an amount of olefinic monomer in the terpolymer of from about 5 to about 50 wt %. Most preferred is when n and r represent an amount of from about 5 to about 40 wt % of the olefin comonomer.

The letters m and s represent the amount of the second monomeric unit, whether said second monomer unit is an ester or a neutralized acid. In a preferred mode of the present invention m and s represent an amount of this co-monomer from about 1% to about 50 wt %. In a more preferred embodiment of the invention, this comonomer is present in an amount of from about 1% to about 35 wt %.

Letters o and t, respectively, represent the amounts of carbon monoxide or epoxy containing monomer present in the present invention. The letters o and t preferably represent numbers reflecting an amount of this comonomer of from about 1 to 25 wt %, more preferably 1 to about 20 wt % and most preferably from about 1 to about 15 wt %.

Various polymers according to formulas III and IV above are known to the person of ordinary skill in the art and are available commercially as the FUSABOND® family of resins and the ELVALOY® family of resins from DuPont de Nemours of Delaware. Various grades of these resins are available and may be used according to the particular properties desired for the final golf ball cover.

The golf ball covers according to the present invention may include mixtures of polymers chosen according to considerations such as speed of manufacture using particular blends and the properties desired in the final golf ball cover.

The terpolymers having by formulas III or IV may be blended with olefinic mono, di or tri carboxylic acid copolymers such as ethylene methacrylic acid or ethylene acrylic acid to form ionomers such as those sold under the tradename SURLYN® ionomers, including SURLYN™ 8320, 8120, 9320, 7930, 8020, 8550, 8660, 8940, 9020, 9520, 9730, 9970, AD 8512, AD 8511, AD 8195 and AD 8444, as well as other polymeric materials known to the person of ordinary skill in the art.

In addition, several different types of polymers may be blended together to form a cover stock for golf balls. In a preferred embodiment 3 different polymers and/or ionomers are blended to form a cover stock having advantageous properties. The three different polymers are selected from the group consisting of polymers described by formulae III and IV above, i.e., ionomers, such as those sold under the tradename SURLYN™ resins and IOTEK™ resins from Dupont and Exxon respectively.

The terpolymers of the present invention can be made according to any of the various means known to the ordinary skilled artisan in this field, such as by addition free radical polymerization, cationic or anionic polymerization, or catalyst driven polymerization to name but a few. As the polymer chemist knows each of these different methods can be used to produce different types of terpolymers such as graft polymers, block polymers, random polymers, etc.

Any of the polymers produced as indicated above can be used according to the present invention, depending on the desired properties of the resultant golf ball cover.

As a general proposition, polymerization of vinyl monomers occurs in the presence of small amounts of a wide variety of reagents known as initiators. Since initiators are often destroyed, it is not proper to refer to these substances as "catalysts", although the latter term is sometimes used. Initiators are believed to form some reactive species, such as an ion or a free radical, which can add to carbon-carbon double bonds to form a new ion or radical, and which can in turn add to another unit.

The terpolymers of the present invention are preferably made by adding three monomers, in gaseous form, selected from the three different classes of monomers described above for use in the present invention, to a reaction vessel. An initiator is added together with the gases to promote a free radical polymerization reaction.

The preferred initiators for use in forming the polymers of the present invention are those which produce reactive free radicals at a controllable rate. These free-radical initiators can be generally classified into several catagories.

The first category is peroxide compounds of the formula:

$$R_5\text{-O-O-}R_6 \qquad \text{(v)}$$

wherein $R_5$ and $R_6$ are selected from among linear or branched chain alkyl, and substituted or unsubstituted carbocyclic or aryl groups as defined above. This class of initiators is the most preferred class for use in making the compounds according to the present invention. Of the linear or branched chain alkyl, substituted or unsubstituted aryl or carbocyclic groups, the most preferred include those in which $R_5$ and $R_6$ are the same or different and are hydrogen, methyl, ethyl or are selected from the group consisting of dicamyl peroxide, 2,4-pentanedione peroxide, di(n-propyl) peroxydicarbonate, di(sec-butyl)peroxydicarbonate, di(2-ethylhexyl)peroxydicarbonate, α-cumyl peroxy-neodecanoate, 1,1-dimethyl-3-hydroxy-butyl peroxy-neoheptanoate, α-cumyl peroxy-neoheptanoate, t-amyl peroxy-neodecanoate, t-butyl peroxy-neodecanoate, t-amyl peroxy-pivalate, t-butyl peroxy-pivalate, 1,1-dimethyl-3-hydroxybutyl peroxy-2-ethylhexanoate, 2,5-dimethyl 2, 5-di (2-ethylhexanoyl peroxy) hexane, t-amyl peroxy-2-ethylhexanoate, t-butyl peroxy-2-ethylhexanoate, t-butyl peroxyisobutyrate, t-butyl peroxyacetate, t-amyl peroxyacetate, t-butyl perbenzoate, t-amyl perbenzoate, di-t-butyl diperoxyphthalate, oo-t-butyl o-isopropyl monoperoxycarbonate, 2,5-dimethyl-2, 5-di(benzoylperoxy)hexane, oo-t-butyl 1-(2-ethylhexyl) monoperoxycarbonate, oo-t-amyl o-(2-ethylhexyl) monoperoxycarbonate, dicumyl peroxide, 2,5-dimethyl-2,5-di-(t-Butylperoxy) hexane.

Two other useful categories of initiator compounds include azo compounds, which undergo thermal decomposition at temperatures not far above room temperature and photosensitizers. Upon absorbing light, these compounds decompose or react with other molecules to form radicals.

The reaction to produce the present copolymers is preferably carried out at elevated temperatures. The preferred temperature range is from about 100° C. to about 270° C. The most preferred temperatures range from about 130° to about 230°.

Terpolymers according to the claimed invention are preferably formed under elevated pressures. It is preferred to make the present polymers under pressures greater than about 70 MPa. It is more preferable to carry out the present invention at pressures of from about 140 MPa to about 350 MPa.

Various other reactions of free radicals can compete with the addition reaction. Such "side reactions" may involve the monomer, the polymer, or foreign additives and impurities. These side reactions may have an influence on the course of a polymerization and can be used to control polymer properties and monomer stability according to methods known to the ordinary skilled artisan.

Inhibitors can be used in the reaction producing the present polymers to degrade growing radicals to inactive products. Common inhibitors are oxygen, iodine, quinones, and polycyclic aromatic hydrocarbons. A typical inhibitor is benzoquinone.

In an alternate embodiment of the present invention, graft copolymers of the terpolymers described above are used in golf ball covers. In particular, graft polymers are produced such that the graft segment making up the linkage between polymer chains comprises an anhydride, wherein "anhydride" is taken to mean the compound having the formula:

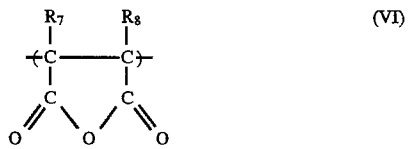

wherein $R_7$ and $R_8$ are the same or different and are chosen from among hydrogen, linear or branched chain alkyl and substituted or unsubstituted carboxylic groups.

Grafting the terpolymer molecules of the present invention can be accomplished according to any technique known in the art. It is preferred that any grafting of the terpolymers of the present invention be accomplished by adding from about 1 to about 25%, or even more preferably from about 1 to about 15% of a grafting agent, such as an anhydride according to Formula VI above, to a terpolymer according to the present invention, in a twin screw extruder. Such post reaction grafting can make the final grafted polymer more flexible.

The present terpolymers are preferably used as golf ball cover materials either alone or in combination with other golf ball cover materials. The present terpolymers may be used in any amount that is effective to produce golf ball covers having desirable properties. The present polymers can be used in a range of from about 1% to about 95%, for example. Alternatively, the subject copolymers can be used in combination with other golf ball cover materials such as for example, ionomers sold under the tradename SURLYN™ by Du Pont and IOTEK™ produced by Exxon. When used in combination with other golf ball cover materials the present polymers can be used in any amount which will effect the final physical characteristics, flight performance or provide some advantage to a golf ball so produced. Under such circumstances the present polymers can be used in an amount that is from about 1% to about 90% of the subject terpolymers. More preferably, golf ball covers having from about 1% to about 70% or most preferably from about 1% to about 50% of the subject terpolymers are used.

Additional components which can be added to the cover composition of the present invention include U.V. stabilizers such as TINUVIN™ 213 and TINUVIN™ 328, for example. Also, light stabilizers such as, for example, TINUVIN™ 770 and TINUVIN™ 765, may also be used. TINUVIN™ products are available from Ciba-Geigy. Other dyes, as well as optical brighteners and fluorescent pigments and dyes may also be used in the golf ball covers produced with terpolymers formed according to the present invention. Such additional ingredients may be used in any amounts that will achieve their desired purpose. However conventional amounts include the range of from about 0.05% to about 1.5% or more preferably, from about 0.5% to about 1.0%.

Effective amounts of white pigment and violet agent can be added to the cover composition. Suitable violet agents include PV Fast Violet RL Special and Hostapern Violet RL Extra Strong sold by Hoechst Celanese Corporation; and Violet 23 sold by Sun Chemical Corporation. The amount of violet agent added to the cover composition is preferably about 0.0005% to about 0.002% based on total weight of cover stock. Good results have been obtained with about 0.001% by weight. Preferably, about 3.5% of the white pigment by weight of the total cover composition is used in the cover stock of the present invention.

Ultra marine blue pigments may also be used in golf ball covers formed according to the present invention. Preferably the amount of ultra marine blue pigment used will range from about 0.01% to about 1.0% or more preferably from about 0.4% to about 0.8%.

Suitable white pigments include titanium dioxide, calcium carbonate, zinc oxide and zinc sulfide. These white pigments may be used in any amount which is suitable to provide a uniform white color of the desired brightness to the golf ball covers of the present invention. In particular, these white pigments may be incorporated in amounts of from about 0.001% to about 5.0%. The more preferred range of white pigment is from about 0.2% to about 0.4%.

Other conventional ingredients, e.g., fillers are well known to the person of ordinary skill in the art and may be included in the present invention in amounts effective to achieve their known purpose.

The optional filler component of the invention is chosen to impart additional density to blends of the previously described components, the selection being dependent upon the type of golf ball desired (i.e., one-piece, two-piece or three-piece), as will be more fully detailed below. Generally, the filler will be inorganic, having a density greater than about 4 gm/cc, preferably greater than 5 gm/cc, and will be present in amounts between 5 and 65 weight percent based on the total weight of the polymer components. Examples of useful fillers include zinc oxide, barium sulfate, lead silicate and tungsten carbide, as well as the other well known corresponding salts and oxides thereof. It is preferred that the filler components be non-reactive with the polymer components described above.

Additional optional additives useful in forming the golf balls of the present invention include acid copolymer waxes (e.g., Allied wax AC143 believed to be an ethylene/16–18% acrylic acid copolymer with a number average molecular weight of 2,040) which assist in preventing reaction between the filler materials (e.g., ZnO) and the acid moiety in the ethylene copolymer; optical brighteners; surfactants; processing aids; etc.

The present copolymers may be blended with any of additional ingredients noted above, for example, to be used in a golf ball cover using any conventional blending technique. For example, the present compounds may be added to a vessel containing pelletized ionomer resins and heated to 300° F.–500° F. Thorough mixing of the materials is accomplished by means of a screw in the heated vessel. Typically, the covers are formed around the solid or wound cores by either compression molding preformed half-shells of the cover stock material or by injection molding the cover stock about the core. The preferred method is compression molding of preformed half-shells.

In compression molding, the half-shells of the stock material are made by injection molding the cover stock material into a conventional half-shell mold at 300° F.–520° F. for a short time. The preformed half-shells are placed around a core to provide an assembly which is introduced into a conventional compression molding machinery such as that shown in U.S. Pat. No. 4,508,309. The ball is allowed to cool in the mold until the cover is hard enough to be handled without deforming. The balls then undergo conventional finishing operations such as buffing, painting and stamping. This type of cover construction is generally referred to as a two-piece cover.

Alternatively, golf balls can be covered solely with the use of an injection molding technique. In injection molding, an injection molding machine is utilized in which the core assembly is placed in a mold cavity. The core assembly is held in place through the use of several retractable pins. Such injection molding machines are well known in the art. The molten cover material is injected into the cavity surrounding the core. As the cover material cools and hardens, the pins retract and the molded ball is ejected from the mold. The balls then undergo conventional finishing operations such as buffing, painting and stamping. This type of cover construction is generally referred to as a one-piece cover.

The golf ball cover materials may be used in any type of golf ball. Golf balls of varying size can also be used according to the present invention. USGA specification conformance dictates that a golf ball must have a diameter of at least 1.680 inches. However, non USGA conformance golf balls can be any size. Golf balls according to the present invention can range from 1.5 inches to 2.5 inches. The preferred range of diameters of golf balls having a constant depth dimple pattern is from about 1.680 to about 1.80 inches. The most preferred range is however from about 1.680 to about 1.750 inches.

In addition, the cover materials of the present invention may also be used in golf balls having any type of construction. For example, the present copolymers may also be used in multilayer covered golf balls and golf balls having multi-layer cores.

EXAMPLES

In order to exemplify the results achieved using the novel golf ball cover materials of the present invention, the following examples are provided without any intent to limit the scope of the instant invention to the discussion therein, all parts and percentages are by weight unless otherwise indicated.

EXAMPLES 1–13x

In each of the following experimental trials numbered 1–13x, the relevant amounts of cover blend ingredients are mixed together to form a batch of cover stock. The relative amounts of the ingredients for each of cover stocks 1–13x is set forth in Table 1.

TABLE 1

| Ingredients | 1[1] | 2 | 3 | 4 | 5 | 6 | 7 | 8 | 9 | 10 | 11 | 12 | 13 | 13X |
|---|---|---|---|---|---|---|---|---|---|---|---|---|---|---|
| Surlyn 7930 | 50 | — | — | — | — | — | — | — | — | — | — | — | — | — |
| Surlyn 8920 | 30 | — | — | — | — | — | — | — | — | — | — | — | — | — |
| Surlyn 7940 | — | — | — | — | — | — | — | — | — | — | — | — | — | — |
| Surlyn 8320 | 20 | — | — | — | — | — | — | — | — | 5 | 5 | 5 | 5 | 5 |
| Surlyn AD8512 (high flow Na, 4.4 MI)[2] | — | 50 | 45 | 50 | 45 | 50 | 45 | 45 | 40 | 35 | 35 | 35 | 35 | 35 |
| Surlyn AD8511 (high flow Zn, 3.4 MI)[2] | — | 40 | 40 | 40 | 40 | 20 | 20 | 40 | 40 | 20 | 20 | 40 | 40 | 40 |
| Surlyn 9020 (1.1 MI, Flex 14KPS)[2] | — | — | — | — | — | 20 | 20 | — | — | 20 | 20 | — | — | — |
| EP4126 (E28nBA/5 GMA, 200 MI)[2] | — | 5 | 5 | — | — | 5 | 5 | 5 | 5 | 5 | — | — | 5 | 5 |
| EXP 4934-6(E28-nBA-1.8 GMA 15 MI)[2] | — | — | — | 5 | 5 | — | — | — | — | — | 5 | 5 | — | — |
| Fusabond MF175D (E30-nBA-10CO-1%MA)[3] | — | — | — | — | — | — | — | 5 | 5 | 5 | 5 | 5 | 5 | 5 |
| Nucrel RX9-1(E23-nBA-9.6 MAA25 MI)[2,4] | — | 5 | 10 | 5 | 10 | 5 | 10 | 5 | 10 | 10 | 10 | 10 | 10 | 10 |
| White Concentrate | 5 | 5 | 5 | 5 | 5 | 5 | 5 | 5 | 5 | 5 | 5 | 5 | 5 | 5 |

[1]Composition no. 1 was used as a control.
[2]ASTM D-1238 (condition E, 190° C. using a 2160 gram wt.) is used to determine the melt index ("MI").
[3]"MA" is maleic anhydride.
[4]"MAA" is methacrylic acid.

The cover stocks were used to make half-shells in a conventional half-shell injection molding machine which heats the cover stock to 400° F. (204° C.) and injects the fluid cover stock into molds. The half-shells were formed about the solid cores in a compression mold at 260°–280° F. (127°–138° C.) for 10 minutes to yield golf balls with diameters of about 1.68 inches (4.3 cm) and nominal cover thicknesses of about 0.04 inches (0.1 cm).

Each series of balls made from cover stocks 1–13x were tested for their physical properties, and their performance characteristics such as initial velocity, co-efficient of restitution, and cut resistance. The results from these tests are set out in Table II. As shown in Table II, golf balls having covers formed from the terpolymer materials categorized as nos. 2–8 have properties at least as good as, if not better than, those obtained with control formulation no. 1. In addition, terpolymer formulations 9–13x have properties at least as good as, if not better than control formulation no. 2 (see, e.g., Table II for a description of this control).

TABLE II

| | Sample | | | | | | |
|---|---|---|---|---|---|---|---|
| | 1 | 2 | 3 | 4 | 5 | 6 | 7 |
| I. Physicals | | | | | | | |
| Nameplate avg. | 83 | 82 | 83 | 82 | 82 | 82 | 82 |
| STD. avg. | .001 | .001 | .002 | .001 | .001 | .001 | .001 |
| Equator avg. | 83 | 82 | 82 | 82 | 83 | 82 | 82 |
| STD. avg. | .001 | .001 | .001 | .001 | .001 | .001 | .001 |
| OOR avg. | .002 | .003 | .003 | .002 | .002 | .002 | .002 |
| STD. avg. | .001 | .001 | .001 | .001 | .001 | .001 | .001 |
| Wght. avg. (grams) | 45.53 | 45.44 | 45.44 | 45.42 | 45.49 | 45.50 | 45.43 |
| STD. avg. | 0.09 | 0.09 | 0.09 | | | | |
| Cor. PGA avg. (grams) | 106 | 107 | 107 | 107 | 107 | 107 | 106 |
| STD. avg. | .002 | .001 | .002 | .002 | .001 | .001 | .001 |
| II. Performance | | | | | | | |
| Shore-D Hardness | 67 | 68 | 66 | 67 | 66 | 66 | 63 |
| Initial Velocity (FPS) | 254.04 | 253.50 | 253.41 | 253.49 | 253.52 | 253.17 | 253.02 |
| CO-Efficient Rest | 0.816 | 0.819 | 0.809 | 0.812 | 0.810 | 0.808 | 0.807 |
| Adjc. C.O.R. f/s | | | | | | | |
| Hit Test at RT (50% fail) | 600xR | 600xR | 650xR | 842xR | 4fail @1000 | 830xR | 3fail @1000 |
| Hit Test at RT (1st fail) | 200xR | 200xR | 350xR | 600xR | 650xR | 250xR | 650xR |
| Cold Crack Test at 5 DEG. F. | No fail. | No fail. | No fail. | No fail. | No fail. | No fail. | No fail. |
| Cold Crack Test at −50 DEG. F. | No fail. | No fail. | No fail. | No fail. | No fail. | No fail. | No fail. |
| Shear Resistance Rating | 3.2 | 2.8 | 2.8 | 3.1 | 2.9 | 3.0 | 3.3 |
| Cut Resistance Rating | 5.9 | | | | 5.8 | | |
| Paint Durability | 0.5 | 0.5 | 1.5 | 0.5 | 0.5 | 0 | 0.5 |
| Spin Rate from Driver | 3636 | | | | | | |
| Spin Rate from Driver | | 3413 | 3471 | 3443 | | 3460 | 3436 |
| Spin Rate from 8-Iron | 9001 | 7925 | 8037 | 8002 | 9049 | 8127 | 8119 |

| | Sample | | | | | | | |
|---|---|---|---|---|---|---|---|---|
| | 8 | 9 | 10 | 11 | 12 | 13 | 13x | Control #2[5] |
| I. Physicals | | | | | | | | |
| Nameplate avg. | 80 | 80 | 83 | 80 | 81 | 81 | 80 | |
| STD. avg, | .001 | .001 | .001 | .001 | .001 | .001 | .001 | |
| Equator avg. | 81 | 82 | 82 | 82 | 83 | 82 | 82 | |
| STD. avg. | .001 | .001 | .001 | .001 | .001 | .001 | .001 | |
| OOR avg. | .003 | .003 | .002 | .003 | .003 | .004 | .004 | |
| STD. avg. | .001 | .001 | .001 | .001 | .001 | .001 | .001 | |
| Wght. avg. (grams) | 45.44 | 45.41 | 45.49 | 45.43 | 45.49 | 45.58 | 45.53 | |
| STD. avg. | 0.08 | 0.08 | 0.07 | 0.09 | 0.08 | 0.19 | 0.17 | |
| Cor. PGA avg. (grams) | 106 | 106 | 104 | 106 | 106 | 106 | 107 | |
| STD. avg. | .002 | .001 | .001 | .002 | .001 | .002 | .002 | |

| | Sample | | | | | | | |
|---|---|---|---|---|---|---|---|---|
| | 8 | 9 | 10 | 11 | 12 | 13 | 13x | Control #2 |
| II. Performance | | | | | | | | |
| Shore-D Hardness | 64 | 62 | 60 | 60 | 61 | 61 | 61 | 60 |
| Initial Velocity (FPS) | 253.22 | 253.20 | 252.80 | 253.02 | 252.99 | 252.99 | 253.42 | 253.06 |
| CO-Efficient Rest | 0.807 | 0.809 | 0.804 | 0.806 | 0.808 | 0.811 | 0.811 | 0.808 |
| Adjc. C.O.R. f/s | | | | | | | | |
| Hit Test at RT (50% fail) | No fail. | No fail. | No fail. | No fail. | 3fail @1000 | 4fail @1000 | 4fail @1000 | 1fail @ 1000 |
| Hit Test at RT (1st fail) | No fail. | No fail. | No fail. | No fail. | 350xR | 750xR | 924xR | 494xR |
| Cold Crack Test at 5 DEG. F. | No fail. | No fail. | No fail. | No fail. | No fail. | No fail. | No fail. | No fail. |

TABLE II-continued

| Cold Crack Test at −50 DEG. F. | No fail. | No fail. | No fail. | No fail. | No fail. | No fail. | No fail. | No fail. |
|---|---|---|---|---|---|---|---|---|
| Shear Resistance Rating | 3.5 | 3.6 | 4.0 | 4.0 | 3.8 | 4.0 | 4.3 | 3.8 |
| Cut Resistance Rating | | | | | | | | |
| Paint Durability | 0 | 0.5 | 0 | 0.5 | 1 | 1 | 1 | 1.5 |
| R95032 Spin Rate from Driver (with respect to Pinnacle) | | | | | 3781 | 3810 | | 3692 |
| R95033 Spin Rate from Driver (with respect to Pinnacle) | 3522 | 3475 | 3420 | 3580 | | | 3606 | 3435 |
| R95032 Spin Rate from 8-Iron (with respect to Pinnacle) | 8157 | 8137 | 8299 | 8408 | 9139 | 9230 | 9266 | 8233 |

Shear Rating: 3.0 - slight cover shear/paint damage
4.0 = moderate cover shear/fraying/slight material removed
Cut Resistant Rating: Lower number - better cut resistant
Paint Durability Rating: N = 0; SL = 1; M = 2; H = 4
[5]Control No. 2 is used to form the cover of a golf ball manufactured by the Acushnet Cmpany sold under the trade name Titleist HP2.

The scope of the following claims is intended to encompass all obvious changes in the details, materials, and arrangement of parts that will occur to one of ordinary skill in the art:

We claim:

1. A golf ball comprising a cover and a core, wherein the cover comprises a blend of at least one olefinic ionomer and a terpolymer, said terpolymer comprising: (a) a first monomeric component comprising an olefinic monomer having from about 2 to about 8 carbon atoms; (b) a second monomeric component comprising an unsaturated carboxylic acid based acrylate class ester having from about 2 to about 18 carbon atoms; and (c) a third monomeric component comprising at least one monomer selected from the group consisting of carbon monoxide, anhydride monomers and monomers having a structure according to the following formula;

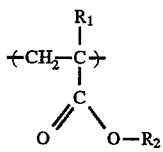

(I)

wherein $R_1$ is hydrogen or a linear chain or branched chain alkyl group of from about 1 to about 18 carbon atoms and $R_2$ is selected from the group consisting of linear chain or branched chain alkyl, carbocyclic and unsubstituted aryl groups, each containing an epoxy moiety.

2. A golf ball comprising a cover and a core, wherein the cover comprises a blend of at least one olefinic ionomer and a terpolymer, said terpolymer comprising: (a) a first monomeric component comprising an olefinic monomer having from about 2 to about 8 carbon atoms; (b) a second monomeric component comprising an unsaturated acrylate class ester having from about 2 to about 18 carbon atoms; and, (c) a third monomeric component comprising a structure according to the following formula;

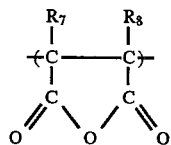

(VI)

wherein $R_7$ and $R_8$ are the same or different and are selected from the group consisting of hydrogen, linear or branched chain alkyl and carbocyclic groups.

3. The golf ball of claim 1 or 2 wherein said first monomeric component comprises a vinyl olefin monomer having a terminal point of unsaturation capable of undergoing polymerization reactions.

4. The golf ball of claim 1 or 2 wherein said first monomeric component is selected from the group consisting of ethylene, propylene, butene, pentene, hexene, heptene and octene.

5. The golf ball of claim 1 or 2 wherein said second monomeric component comprises an acrylate class ester formed from an unsaturated carboxylic acid selected from the group consisting of acrylic acid, methacrylic acid, α-chloroacrylic acid, crotonic acid, maleic acid, fumaric acid, itaconic acid, cinnamic acid and mixtures thereof.

6. The golf ball of claim 1 or 2 wherein said second monomeric component is an unsaturated acrylate class ester having the formula:

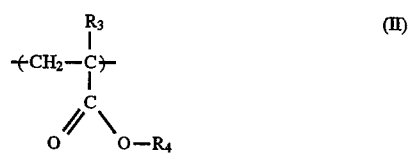

(II)

wherein $R_3$ and $R_4$ are selected from the group consisting of hydrogen and a linear or branched chain alkyl group having from about 1 to about 20 carbon atoms.

7. The golf ball of claim 6 wherein said acrylate class esters are selected from the group consisting of pentyl acrylate, pentyl methacrylate, n-butyl acrylate, iso-butyl acrylate, n-butyl methacrylate, propyl acrylate, propyl methacrylate, ethyl acrylate, ethyl methacrylate, methyl methacrylate, methyl acrylate, iso-burnyl acrylate, iso-burnyl methacrylate and tetrahydrofurfuryl acrylate.

8. The golf ball of claim 1 wherein said third monomeric component is carbon monoxide.

9. The golf ball of claim 1 wherein said third monomeric component is an anhydride having the formula

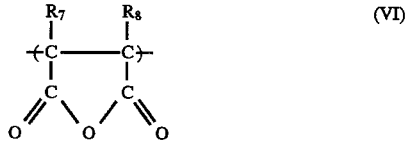

(VI)

wherein $R_7$ and $R_8$ are the same or different and are selected from the group consisting of hydrogen, linear or branched chain alkyl, and carbocyclic groups.

10. The golf ball of claim 1 wherein said third monomeric component is a monomer having the formula

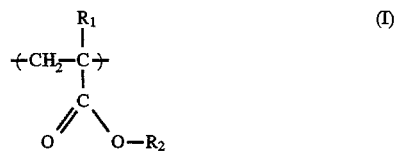

wherein $R_1$ is hydrogen or a linear chain or branched chain alkyl group of from about 1 to about 18 carbon atoms and $R_2$ is selected from linear or branched chain alkyl and carbocyclic and aryl groups, each containing an epoxy moiety.

11. The golf ball of claim 1 wherein said cover comprises a terpolymer having the following formula:

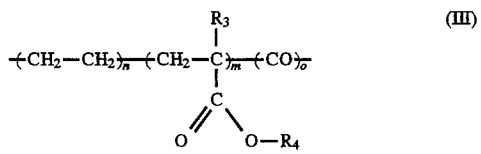

wherein $R_3$ and $R_4$ are selected from among hydrogen and a linear or branched chain alkyl group having from about 1 to about 20 carbon atoms.

12. The golf ball of claim 1 wherein said cover comprises a terpolymer having the following formula:

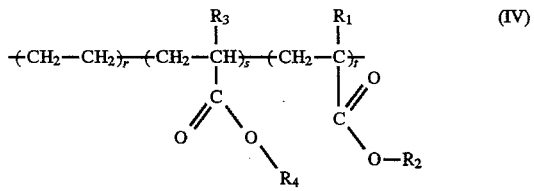

wherein $R_1$ is hydrogen or a linear chain or branched chain alkyl group of from about 1 to about 18 carbon atoms and $R_2$ is selected from the group consisting of linear chain or branched chain alkyl, carbocyclic or unsubstituted aryl groups, each containing an epoxy moiety and wherein $R_3$ and $R_4$ are selected from among hydrogen and a linear or branched chain alkyl group having from about 1 to about 20 carbon atoms.

13. The golf ball of claim 11 or 12 wherein said cover comprises from about 5 to about 75% by weight of said first monomeric component.

14. The golf ball of claim 13 wherein said cover comprises from about 5 to about 50% by weight of said first monomeric component.

15. The golf ball of claim 14 wherein said cover comprises from about 5 to about 40% by weight of said first monomeric component.

16. The golf ball of claim 11 or 12 wherein said cover comprises from about 1 to about 50% by weight of said second monomeric component.

17. The golf ball of claim 16 wherein said cover comprises from about 1 to about 35% by weight of said second monomeric component.

18. The golf ball of claim 11 or 12 wherein said cover comprises from about 1 to about 25% by weight of said third monomeric component.

19. The golf ball of claim 18 wherein said cover comprises from about 1 to about 20% by weight of said third monomeric component.

20. The golf ball of claim 19 wherein said cover comprises from about 1 to about 15% by weight of said third monomeric component.

21. The golf ball of claim 1 wherein said olefinic ionomer comprises a terpolymer of an olefin having from about 2 to about 8 carbon atoms, a softening comonomer selected from the group consisting of acrylate and methacrylate and an unsaturated carboxylic acid selected from the group consisting of acrylic and methacrylic acid.

22. The golf ball of claim 21 wherein from about 1 to about 90% weight of acid moieties on the carboxylic acid are neutralized by at least one metal cation.

23. The golf ball of claim 22 wherein said at least one metal cation is selected from the group consisting of lithium, sodium, potassium, magnesium, calcium, barium, lead, tin, zinc and aluminum.

24. The golf ball of claim 21 wherein said olefinic ionomer has a flex modulus of from about 500 to about 150,000 psi.

25. The golf ball of claim 21 wherein said olefinic ionomer has a Shore D hardness of from about 20 to about 80.

26. The golf ball of claim 21 wherein said olefinic ionomer has a melt flow index of from about 0.3 to less than 2 grams per 10 minutes.

27. The golf ball of claim 21 wherein said olefinic ionomer has a melt flow index of from two to about 10 grams per 10 minutes.

28. A golf ball comprising a cover and a core, wherein the cover comprises a blend of at least one olefinic ionomer and a terpolymer, said terpolymer comprising: (a) a first monomeric component comprising an olefinic monomer having from about 2 to about 8 carbon atoms; (b) a second monomeric component comprising an unsaturated acrylate class ester having from about 2 to about 18 carbon atoms; and (c) a third monomeric component comprising at least one monomer selected from the group consisting of (1) carbon monoxide, (2) anhydride monomers having the formula

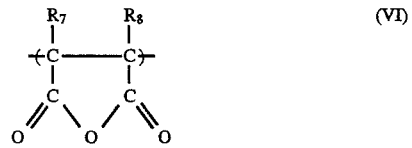

wherein $R_7$ and $R_8$ are the same or different and are chosen from the group consisting of hydrogen, linear or branched chain alkyl, and carbocyclic groups, and (3) monomers having a structure according to the following formula

wherein $R_1$ is hydrogen or a linear chain or branched chain alkyl group of from about 1 to about 18 carbon atoms and $R_2$ is selected from linear or branched chain alkyl, carbocyclic and unsubstituted aryl groups, each containing an epoxy moiety.

29. The golf ball of claim 28 wherein said third monomeric component is carbon monoxide.

30. The golf ball of claim 28 wherein said third monomeric component is an anhydride monomer having the formula

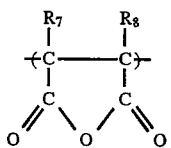

(VI)

wherein $R_7$ and $R_8$ are the same or different and are chosen from the group consisting of hydrogen, linear or branched chain alkyl, and carbocyclic groups.

31. The golf ball of claim 28 wherein said third monomeric component is a monomer having a structure according to the following formula

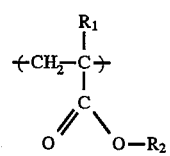

(I)

wherein $R_1$ is hydrogen or a linear or branched chain alkyl group of from about 1 to about 18 carbon atoms and $R_2$ is selected from linear or branched chain alkyl, carbocyclic and unsubstituted aryl groups, each containing an epoxy moiety.

* * * * *